US009823910B2

(12) United States Patent
Horie et al.

(10) Patent No.: US 9,823,910 B2
(45) Date of Patent: *Nov. 21, 2017

(54) OBTAINING CORRECT COMPILE RESULTS BY ABSORBING MISMATCHES BETWEEN DATA TYPES REPRESENTATIONS

(71) Applicant: INTERNATIONAL BUSINESS MACHINES CORPORATION, Armonk, NY (US)

(72) Inventors: Michihiro Horie, Saitama (JP); Hiroshi H. Horii, Tokyo (JP); Kiyokuni Kawachiya, Kanagawa (JP); Mikio Takeuchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,800

(22) Filed: Aug. 10, 2016

(65) Prior Publication Data
US 2016/0350086 A1     Dec. 1, 2016

Related U.S. Application Data

(63) Continuation of application No. 14/725,219, filed on May 29, 2015, now Pat. No. 9,459,848.

(51) Int. Cl.
*G06F 9/45* (2006.01)

(52) U.S. Cl.
CPC .............. *G06F 8/42* (2013.01); *G06F 8/427* (2013.01); *G06F 8/43* (2013.01); *G06F 8/437* (2013.01); *G06F 8/443* (2013.01)

(58) Field of Classification Search
None
See application file for complete search history.

(56) References Cited

U.S. PATENT DOCUMENTS 8,640,140 B2    1/2014  Waddington et al.
2007/0226708 A1*  9/2007  Varma ................ G06F 8/51
                                                717/139

(Continued)

FOREIGN PATENT DOCUMENTS

CN   103631632        3/2014
WO   WO2008/108665  *  9/2008  ............. G06F 8/443
WO   WO2014040766     3/2014

OTHER PUBLICATIONS

Quinlan et al., "The ROSE Source-to-Source Compiler Infrastructure", Lawrence Livermore National Laboratory, Sep. 2011, pp. 1-3.

(Continued)

*Primary Examiner* — H S Sough
*Assistant Examiner* — Timothy Duncan
(74) *Attorney, Agent, or Firm* — Tutunjian & Bitetto, P.C.; Vazken Alexanian

(57) ABSTRACT

Methods and a system are provided. A method includes implementing a function, which a compiler for a first language does not have, using a compiler for a second language. The implementing step includes generating, by the compiler for the first language, a first abstract syntax tree. The implementing step further includes converting, by a converter, the first abstract syntax tree to a second abstract syntax tree of the compiler for the second language using a conversion table from data representation types in the first language to data representation types in the second language. When a compilation error occurs, the implementing step also includes generating a special node for error processing in the second abstract syntax tree and storing an error token in the special node. When unparsing, the implementing step additionally includes outputting the error token, in the form of source code written in the first language.

20 Claims, 8 Drawing Sheets

(56) References Cited

U.S. PATENT DOCUMENTS

| | | | |
|---|---|---|---|
| 2010/0325619 A1* | 12/2010 | Song | G06F 8/443 |
| | | | 717/143 |
| 2012/0102500 A1 | 4/2012 | Waddington et al. | |
| 2013/0174131 A1* | 7/2013 | Takeuchi | G06F 8/51 |
| | | | 717/137 |
| 2013/0326204 A1* | 12/2013 | Grimm | G06F 8/423 |
| | | | 712/234 |
| 2014/0282373 A1 | 9/2014 | Garza | |
| 2015/0067441 A1* | 3/2015 | Gorissen | G06F 7/544 |
| | | | 714/759 |

OTHER PUBLICATIONS

List of IBM Patents or Patent Applications Treated as Related dated Aug. 10, 2016, 2 Pages.

* cited by examiner

| DSL | ROSE |
|---|---|
| X10.lang.Long | long |
| X10.lang.Int | int |
| X10.lang.Rail[T] | T[] |
| X10.lang.Array_2[T] | T[][] |
| ⋮ | ⋮ |

FIG. 8

OBTAINING CORRECT COMPILE RESULTS BY ABSORBING MISMATCHES BETWEEN DATA TYPES REPRESENTATIONS

GOVERNMENT RIGHTS

This invention was made with Government support under Contract No.: DE-SC0008923 (DoE-MIT), 5710003274 (MIT-IBM) awarded by the Department of Energy. The Government has certain rights in this invention.

BACKGROUND

Technical Field

The present invention relates generally to compiling and, in particular, to obtaining correct compile results by absorbing mismatches between data type representations when different compilers are combined.

Description of the Related Art

After converting a type in a domain-specific language (DSL) to a corresponding type in an existing compiler (e.g., a ROSE compiler), when a field access or a method invocation that is not defined in the existing compiler exists, the compilation will fail because the field or the method does not exist in the converted type in the existing compiler.

For example, it may be necessary to convert an abstract syntax tree (AST) that is created by the DSL compiler to an AST of the existing compiler. However, simply converting an AST as per the prior art not only disables the optimization support of the existing compiler but also causes compilation errors. For example, there is a mismatch of data type representations between the two compilers. Consider the following two examples involving a ROSE compiler and an X10 compiler. In the first example, to represent the type for an integer value, X10 uses an object type "x10.1ang.Int", while in contrast ROSE uses the primitive type "int". In the second example, to represent the type for an array of integers, X10 uses "x10.1ang.Rail[x10.1ang.Int]", while in contrast ROSE uses "int[ ]". Also, there are different functions between these corresponding classes.

Thus, there is a need for obtaining correct compile results by absorbing the mismatch between data type representations when different compilers are combined.

SUMMARY

According to an aspect of the present principles, a method is provided. The method includes implementing a function, which a compiler for a first language does not have, using a compiler for a second language. The implementing step includes generating, by the compiler for the first language, a first abstract syntax tree by parsing source code written in the first language or a domain specific language based on the first language. The implementing step further includes converting, by a data representation type converter, the first abstract syntax tree to a second abstract syntax tree of the compiler for the second language using a conversion table from data representation types in the first language to data representation types in the second language. When a compilation error occurs in the compiler for the second language, the implementing step also includes generating therein a special node for error processing in the second abstract syntax tree and storing an error token indicating information of the compilation error in the special node. When unparsing by the compiler for the second language, the implementing step additionally includes outputting the error token stored in the special node, in the form of source code written in the first language.

According to another aspect of the present principles, a method is provided. The method includes transforming a program from a first language to a second language using a compiler for a third language and data type representation conversion without helper classes. The transforming step includes generating, by a compiler for the first language, an abstract syntax tree by parsing source code written in the first language or a domain specific language based on the first language. The transforming step further includes converting, by the compiler for the third language, the first abstract syntax tree to a given abstract syntax tree of the compiler for the third language using a conversion table from data representation types in the first language to data representation types in the third language. When a compilation error occurs in the compiler for the third language, the transforming step also includes generating therein a special node for error processing in a second abstract syntax tree of the compiler of the second language and storing an error token indicating information of the compilation error in the special node. When unparsing by the compiler for the second language, the transforming step additionally includes outputting the error token stored in the special node, in the form of source code written in the first language.

According to yet another aspect of the present principles, a system is provided. The system includes a compiler for a first language, a first abstract syntax tree by parsing source code written in the first language or a domain specific language based on the first language. The system further includes a compiler for a second language. The system also includes a data representation type converter for converting the first abstract syntax tree to a second abstract syntax tree of the compiler for the second language using a conversion table from data representation types in the first language to data representation types in the second language. The compiler for the second language, when a compilation error occurs, generates a special node for error processing in the second abstract syntax tree and stores in the special node an error token indicating information of the compilation error. The compiler for the second language, when unparsing, outputs the error token stored in the special node is output, in the form of source code written in the first language.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 shows an exemplary table 800 of type conversion between DSL and ROSE, in accordance with an embodiment of the present principles.

DETAILED DESCRIPTION OF PREFERRED EMBODIMENTS

Figure 1:
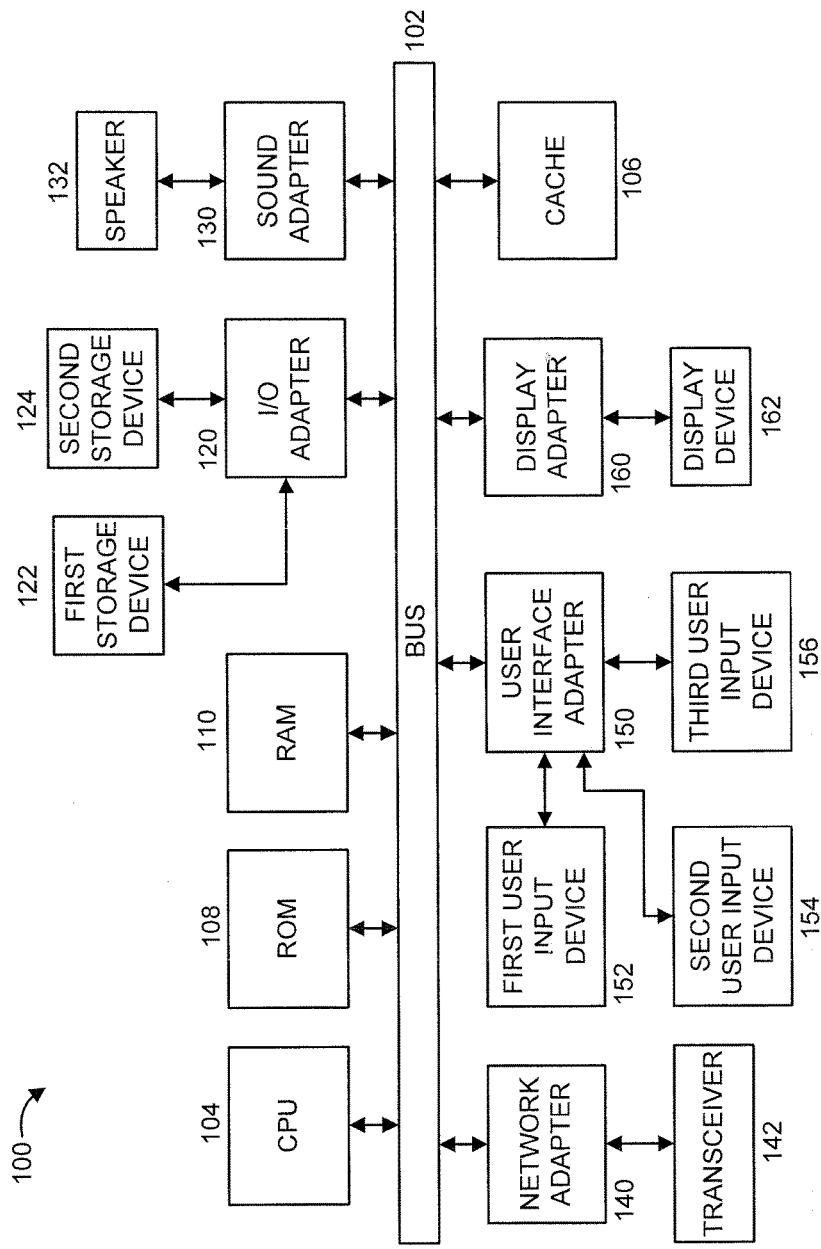
FIG. 1 shows an exemplary processing system 100 to which the present principles may be applied, in accordance with an embodiment of the present principles.

The present principles are directed to obtaining correct compile results by absorbing mismatches between data type representations when different compilers are combined.

For example, consider the case of transforming a first program, written using a first compiler for a first language (e.g., a domain-specific language), to a second program, written using a second compiler for a second (e.g., target) language. In an embodiment, the present principles advantageously allow for the implementation of a function, which the second compiler for the second language does not have, using an existing compiler (e.g., a third compiler for a third language). Thus, as used herein, the phrase "existing compiler" can refer to a compiler that is not necessarily part of the transformation (from a first language written by a first compiler to a second language written by a second compiler), but is available for use to in order to absorb mismatches between data type representations among the first compiler and the second compiler.

For the sake of illustration, examples will focus on transforming a program written in a domain specific language (DSL) using a DSL compiler to X10 as the target language written using an X10 compiler, where optimization support will be provided by an existing (third) compiler implemented as a ROSE compiler. Of course, the preceding compiler and language types are merely illustrative and, thus, other compiler and language types can also be used in accordance with the teachings of the present principles, while maintaining the spirit of the present principles. Moreover, other embodiments can involve different numbers of compilers, while maintaining the spirit of the present principles.

In an embodiment, we reuse optimization support that is not provided by the compiler for the target programming language but another compiler (e.g., a ROSE compiler). Reusing existing support involves a lower cost than implementing new support in the target compiler. Thus, for example, we can use ROSE's optimization support that is not provided by the X10 compiler, when transforming a program from a DSL to X10.

In an embodiment, the present principles advantageously convert an abstract syntax tree (AST) created by a domain-specific language (DSL) compiler to an AST for an existing compiler (e.g., a ROSE compiler) without using helper classes. An AST is a tree representation of the abstract syntactic structure of source code written in a programming language. Each node of the tree denotes a construct occurring in the source code. The syntax is "abstract" in not representing every detail appearing in the real syntax.

In an embodiment, when an error occurs at the time of conversion of an AST created by a DSL compiler to an AST for an existing compiler (e.g., a ROSE compiler), the information of a token that causes the error is stored in a special AST node of the existing compiler after handling the error, and the unparser of the existing compiler outputs the information stored in the special AST node as-is.

Thus, in an embodiment, even if a compilation error occurs at the time of conversion into a ROSE AST, the parser can advantageously handle the error by storing the information into a corresponding ROSE AST node, and the parser can continue its compilation process. When the unparser outputs source code, the stored information can be output as-is.

Since errors in a source file can be detected by a DSL compiler, other errors that occur during the semantic analysis (such as type checking) at the time of conversion into a ROSE AST can be considered to be caused by the mismatch of data types between the DSL compiler and the ROSE compiler FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
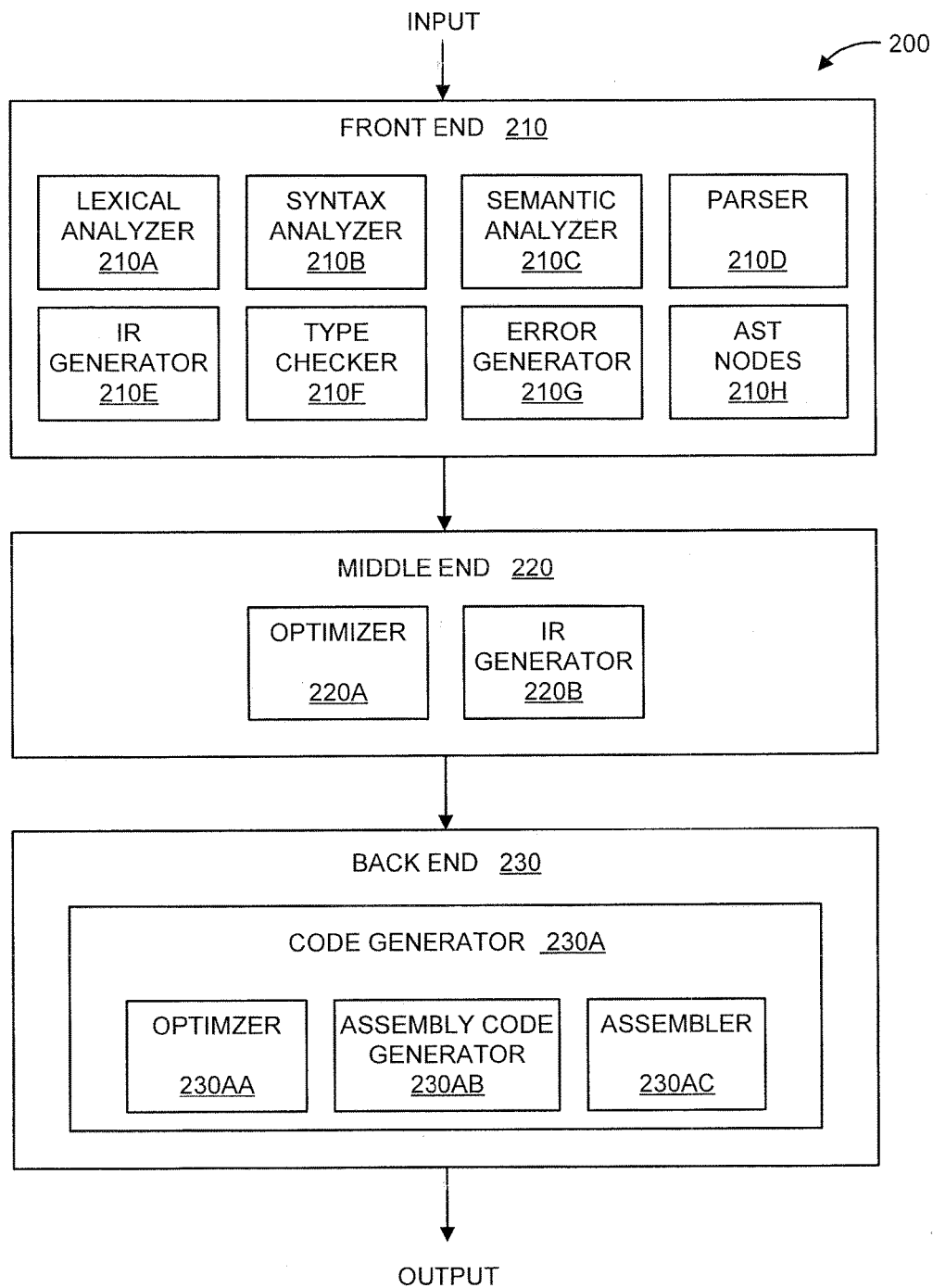
FIG. 2 shows an exemplary compiler 200, in accordance with an embodiment of the present principles.

Moreover, it is to be appreciated that compiler 200 described below with respect to FIG. 2 is a compiler for implementing respective embodiments of the present principles. Part or all of processing system 100 may be implemented in one or more of the elements of compiler 200.

Figure 3:
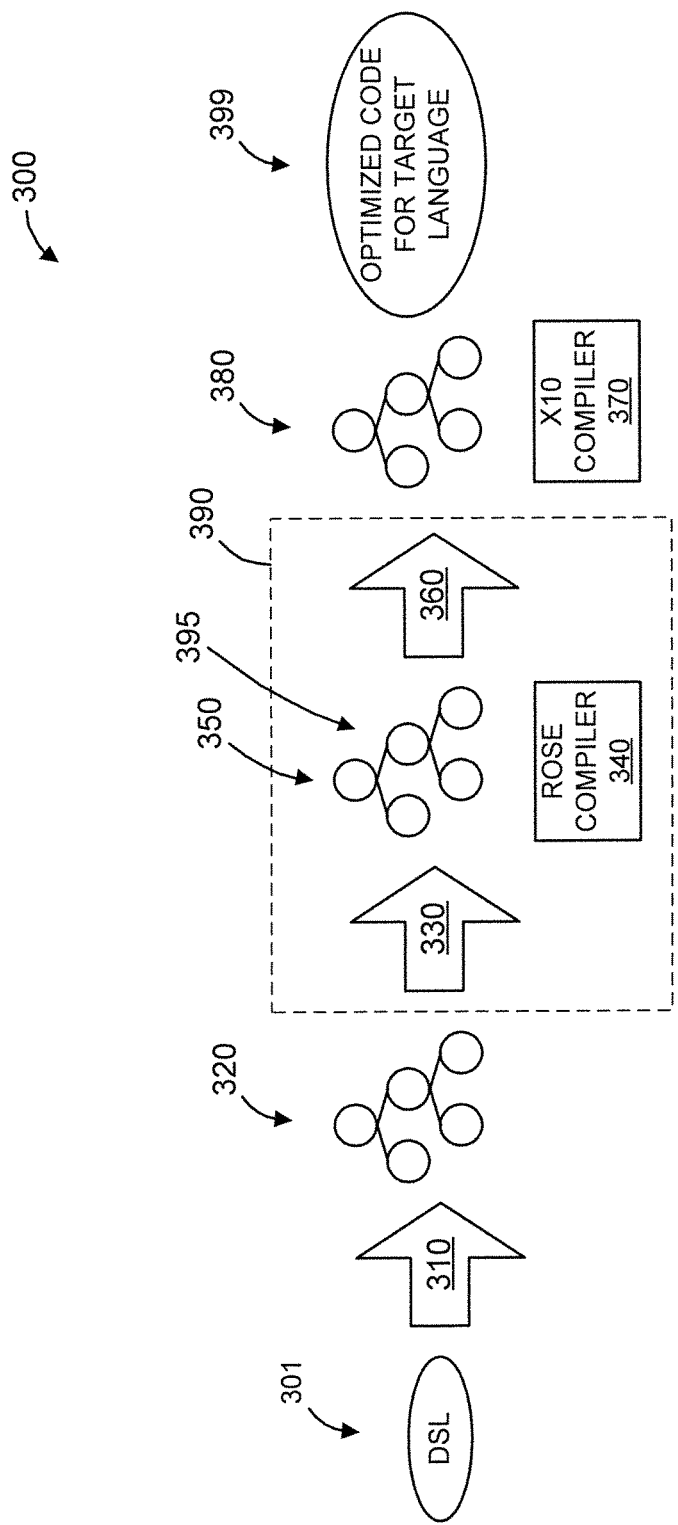
FIG. 3 shows an exemplary multiple-compiler configuration 300 to which the present principles can be applied, in accordance with an embodiment of the present principles.
Figure 4:
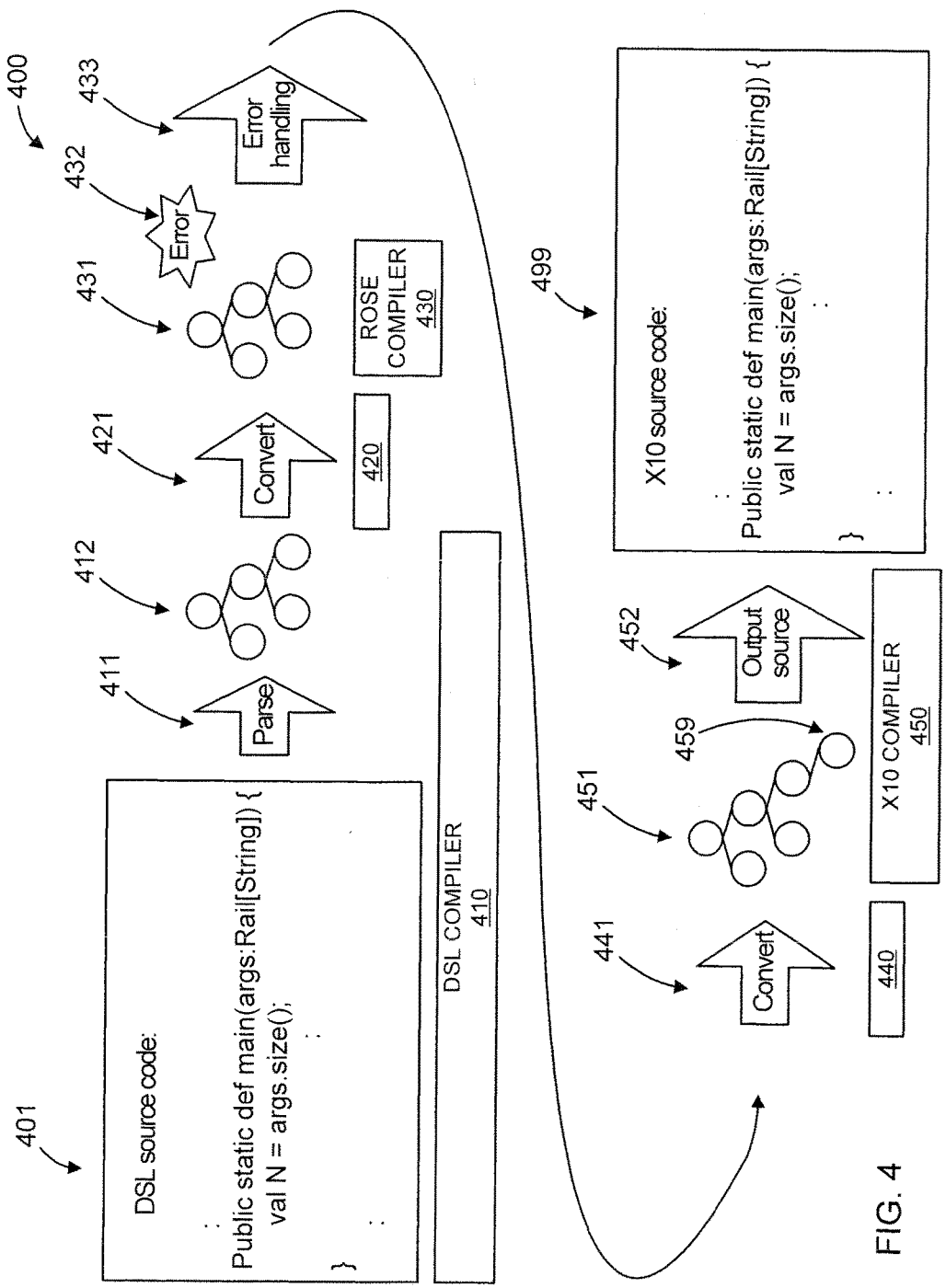
FIG. 4 shows another exemplary multiple compiler configuration 400 to which the present principles can be applied, in accordance with an embodiment of the present principles.
Figure 5:
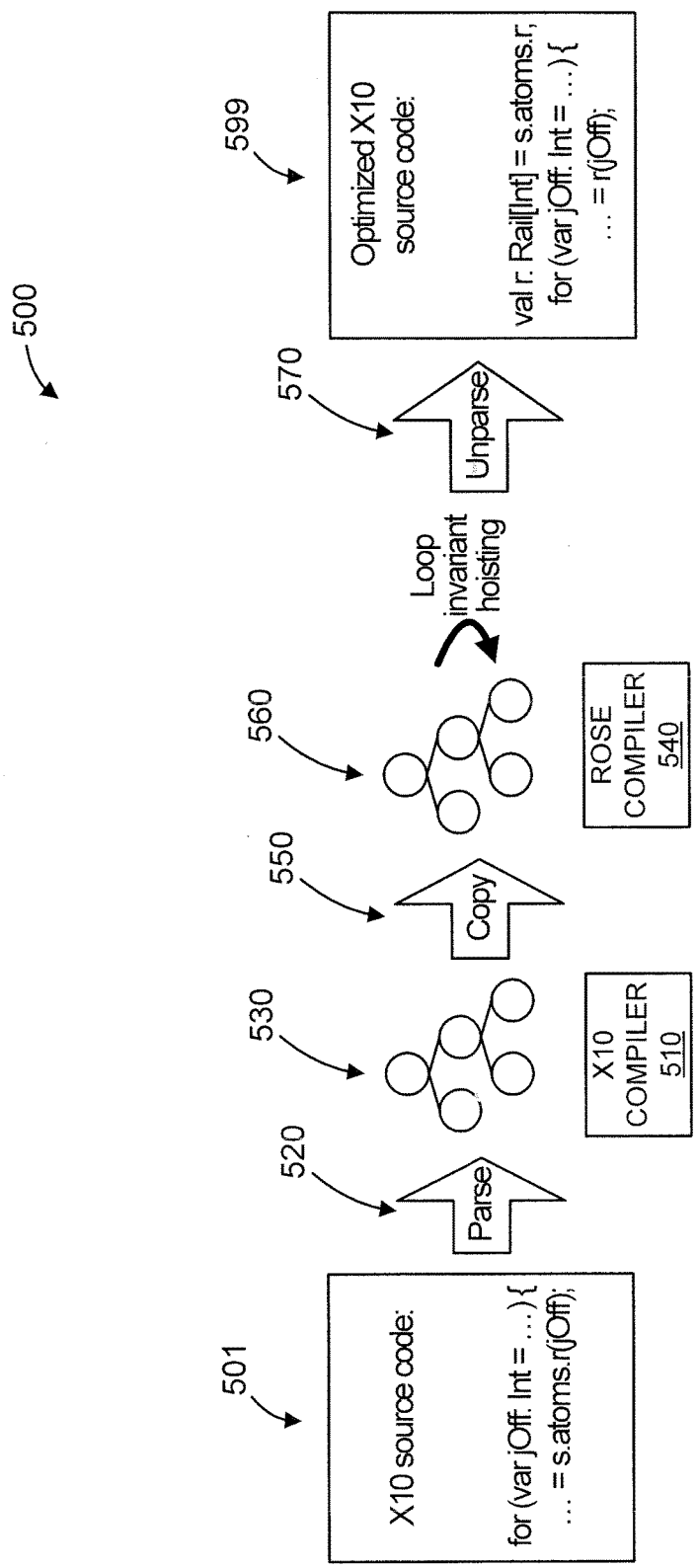
FIG. 5 shows yet another exemplary multiple compiler configuration 500 to which the present principles can be applied, in accordance with an embodiment of the present principles.

FIGS. 3, 4, and 5 show respective multiple compiler configurations 300, 400, and 500 to which the present principles can be applied. Part or all of compiler 200 may be included within one or more of the compilers shown in FIGS. 3, 4, and 5.

Figure 6:
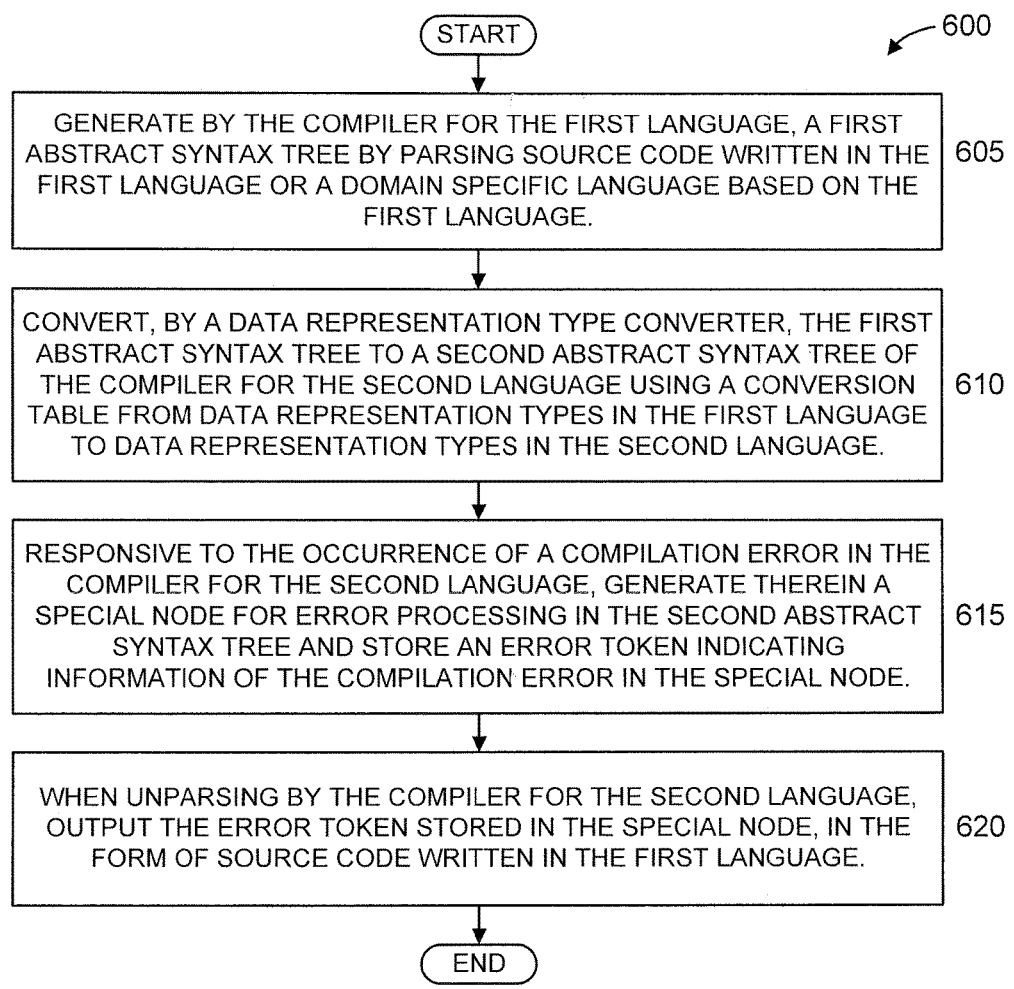
FIG. 6 shows an exemplary method 600 for implementing a function, which a compiler for a first language does not have, using a compiler for a second language, in accordance with an embodiment of the present principles.
Figure 7:
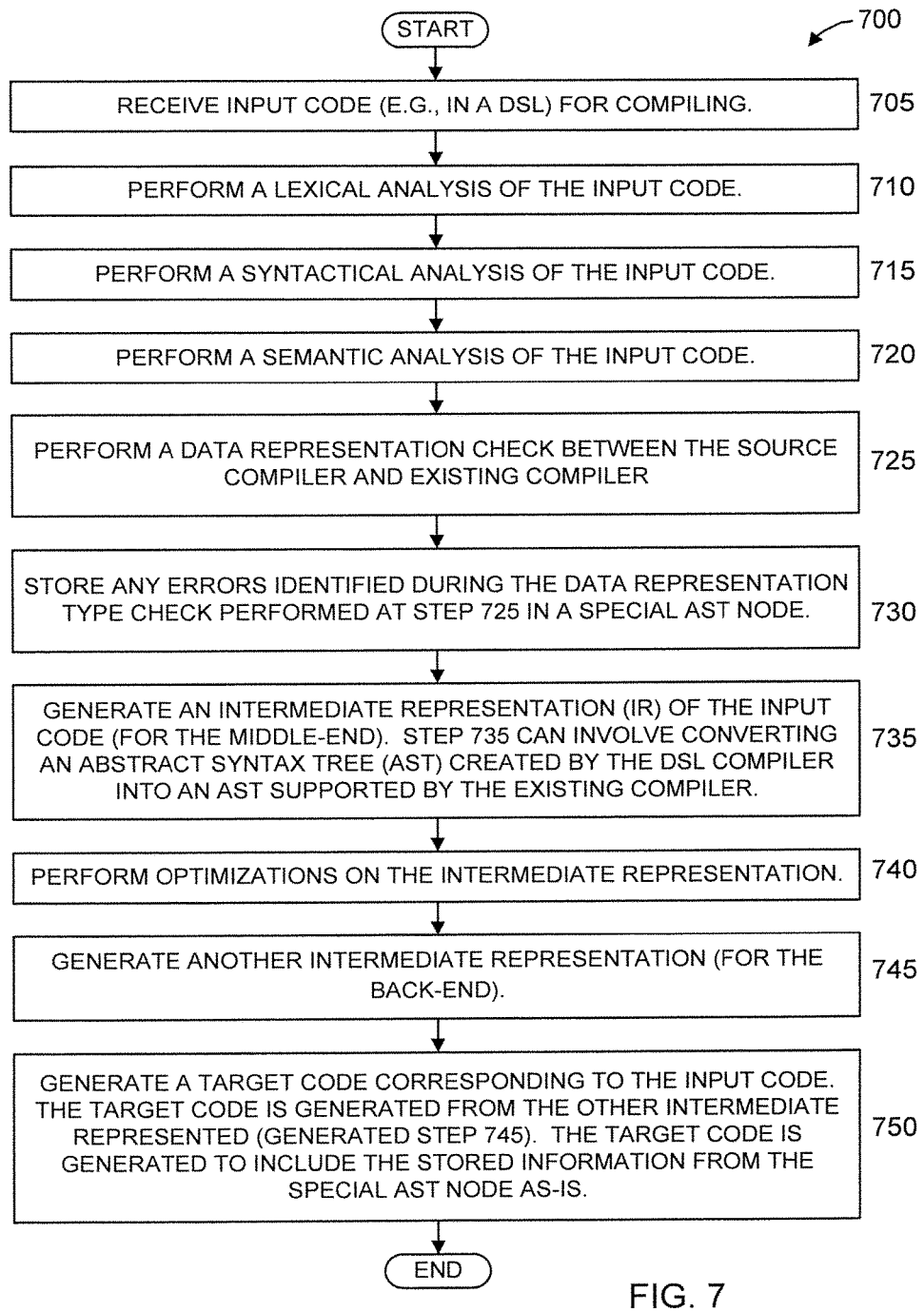
FIG. 7 shows an exemplary method 700 for compiling, in accordance with an embodiment of the present principles.

Further, it is to be appreciated that processing system 100 may perform at least part of the methods described herein including, for example, at least part of method 600 of FIG. 6 and/or at least part of method 700 of FIG. 7. Similarly, part or all of compiler 200 may be used to perform at least part of method 600 of FIG. 6 and/or at least part of method 700 of FIG. 7. Moreover, any of the multiple compiler configurations 300, 400, and 500 can be used to perform at least part of method 600 of FIG. 6 and/or at least part of method 700.

FIG. 2 shows an exemplary compiler 200, in accordance with an embodiment of the present principles.

The compiler 200 includes one or more front-ends 210, a middle-end 220, and one or more back-ends 230. For the sake of simplicity, only one of the front-ends 210 and only one of the back-ends 230 are shown in FIG. 2.

In an embodiment, at least one of the front-ends 210 (e.g., the one depicted in FIG. 2) is a ROSE compiler. Of course, the present principles are not limited to any of the compiler types described herein and, thus, other types of compilers can also be used in accordance with the teachings of the present principles, while maintaining the spirit of the present principles.

Each of the front-ends 210 can include a lexical analyzer (also referred to as a scanner) 210A, a syntax analyzer 210B, and a semantic analyzer 210C for respectively performing a lexical analysis, a syntax analysis, and a semantic analysis on input code (e.g., input source code). In an embodiment, the lexical analyzer 210A outputs tokens, the syntax analyzer 210B outputs an abstract syntax tree, and the semantic analyzer 210C outputs a decorated abstract syntax tree. Each of the front-ends 210 can also include a parser 210D for parsing the input code to assist in one or more of the preceding analysis. In other embodiments, the parser 210D is part of one or more of the analyzers (e.g., analyzers 210B and 210C). Each of the front-ends 210 can further include an intermediate representation (IR) generator 210E for generating an IR of the source code for processing by the middle-end 220. The IR is generated based on a result(s) of one or more of the preceding analysis. Each of the front-ends 210 can additionally include a type checker 210F and an error generator 210G for respectively performing type checking and generating errors and warnings. Each of the front-ends 210 can include a set of abstract syntax tree (AST) nodes 210H for storing any errors that occur at the time of conversion of an AST, created by a domain-specific language (DSL) compiler, to an existing compiler (e.g., ROSE compiler). Thus, for example, when the type checker 210F detects an error, the error can be stored in one of the nodes 210H as described further herein below.

The middle-end 220 can include an optimizer 220A for performing optimizations on the intermediate representation, and an intermediate representation (IR) generator 220B for generating another intermediate representation for the back-end 230. The optimizations can include, but are not limited to, removing useless code, relocating computations to more advantageous (e.g., less frequently executed) locations (e.g., out-of-loop), computation specialization based on context, and so forth. The intermediate representation generated by the middle-end 220 can be source code/machine code independent to enable optimizations that are shareable between different languages and target processors.

The back-end 230 can include a code generator 230A for generating code. The code can be assembly code or executable code (already assembled). In an embodiment, the code generator 230A can include an optimizer 230AA for performing optimizations (e.g., target platform specific optimization including, but not limited to, register allocation and optimized target code utilization of target platform hardware), an assembly code generator 230AB for generating assembly code, and an assembler 230AC for assembling the assembly code into an executable code. The back-end 230 can generate target code (via code generator 230A) for a particular target platform (e.g., a processor or set of processors and a particular operating system).

FIGS. 3-5 show various multiple compiler configurations to which the present principles can be applied. In FIGS. 3-5, converters are shown therein, separate from the various compilers also shown therein. However, it is to be appreciated that in other embodiments, one or more of these converters can be included in one or more of the respective compilers. These and other variations of the elements shown in FIG. 305 are readily contemplated by one of ordinary skill in this and related arts given the teachings of the present principles provided herein, while maintaining the spirit of the present principles.

FIG. 3 shows an exemplary multiple-compiler configuration 300 to which the present principles can be applied, in accordance with an embodiment of the present principles.

The configuration 300 includes a DSL compiler 310, a ROSE from DSL converter 330, a ROSE compiler 340, an X10 from ROSE converter 360, and an X10 compiler 370.

The input to the configuration 300 includes a program 301 written in a DSL. The output from the configuration 300 includes optimized code 399 for a target language.

A DSL AST 320 is created by the DSL compiler 310. The ROSE from DSL converter 330 converts the DSL AST 320 to a ROSE AST 350. The X10 from ROSE converter 360 converts the ROSE AST 350 to an X10 AST 380.

Optimizations 395 can be applied to the program by the ROSE compiler 340.

The ROSE from DSL converter 330, the ROSE compiler 340, and the X10 from ROSE converter 360 can be considered to form a reusable part 390.

Converting the DSL AST 320 to the ROSE AST 350 can be implemented by using application programming interfaces (APIs) provided by the ROSE compiler 340. Thus, by using the APIs, the cost to implement the converter 330 is low. Also, the APIs do not depend on the grammar of the DSL.

Moreover, and quite advantageously, the transformations to ultimately obtain the optimized code 399 are performed without the use of helper functions. Since helper functions are dependent on the DSL, and would require three scripts (a script for generating the definition of helper functions, a script for applying the helper functions, and a script for eliminating the applied helper functions), the avoidance of using helper functions by the present principles is a significant advantage over any prior art approaches that require and use such helper scripts. For example, six hundred and seventeen helper functions are necessary to support the functions of the following fourteen X10 classes: Rail; Float; Double; Int; Byte; Char; Short; Boolean; UByte; Ushort; UInt; ULong; and String.

FIG. 4 shows another exemplary multiple-compiler configuration 400 to which the present principles can be applied, in accordance with an embodiment of the present principles. The configuration 400 includes a DSL compiler 410, a ROSE from DSL converter 420, a ROSE compiler 430, an X10 from ROSE converter 440, and an X10 compiler.

The input to the configuration 400 includes a program 401 written in a DSL. The output from the configuration 400 includes code 499 for a target language.

The DSL source code 401 is as follows:

```
    :
public static def main(args:Rail[String]) {
    val N = args.size( );
        :
}
    :
```

The output code 499 is as follows:

```
    :
public static def main(args:Rail[String]) {
    val N = args.size( );
        :
}
    :
```

A DSL AST 412 is created by the DSL compiler 410 by parsing 411 the DSL source code 401. The ROSE from DSL converter 420 converts the DSL AST 412 to a ROSE AST 431. During compilation (e.g., during type checking), an error 432 is detected, and error handling 433 is performed by the ROSE compiler 430. The X10 from ROSE converter 440 converts the ROSE AST 431 to an X10 AST 451. The X10 AST 451 includes a special node 459 where an error token from the error handling 423 is stored that indicates information of the compilation error 432.

Converting the ROSE AST 431 to the X10 AST 451 can be implemented by using application programming interfaces (APIs) provided by the X10 compiler 450. Thus, by using the APIs, the cost to implement the converter 440 is low.

Moreover, and quite advantageously, the transformations to ultimately obtain the output code 499 are performed without the use of helper functions.

FIG. 5 shows yet another exemplary multiple compiler configuration 500 to which the present principles can be applied, in accordance with an embodiment of the present principles. In the embodiment of FIG. 5, the multiple compiler configuration 500 is used for loop invariant hoisting, and uses the optimization support provided in ROSE to ultimately provide optimized X10 code.

The multiple compiler configuration 500 includes an X10 compiler 510 and a ROSE compiler 540.

The input to the configuration 500 includes X10 source code 501. The output from the configuration 500 includes optimized X10 source code 599.

The X10 source code is as follows:

```
for (var jOff: Int = ...) {
    ... = s.atoms.r(jOff);
```

The optimized X10 source code is as follows:

```
val r:Rail[Int] = s.atoms.r;
for (var jOff: Int = ...) {
    ... = r(jOff);
```

The X10 compiler 510 parses 520 the X10 source code 501, generates an X10 AST 530, and copies (replaces) 550 "Rail[Int]" by "int[ ]" to the ROSE compiler 540.

The ROSE compiler 540 generates a ROSE AST 560, performs loop invariant hoisting, and unparses 570 to output the optimized X10 code.

FIG. 6 shows an exemplary method 600 for implementing a function, which a compiler for a first language does not have, using a compiler for a second language, in accordance with an embodiment of the present principles.

At step 605, generate by the compiler for the first language, a first abstract syntax tree by parsing source code written in the first language or a domain specific language based on the first language.

At step 610, convert, by a data representation type converter, the first abstract syntax tree to a second abstract syntax tree of the compiler for the second language using a conversion table from data representation types in the first language to data representation types in the second language.

At step 615, responsive to the occurrence of a compilation error in the compiler for the second language, generate therein a special node for error processing in the second abstract syntax tree and store an error token indicating information of the compilation error in the special node.

At step 620, when unparsing by the compiler for the second language, output the error token stored in the special node, in the form of source code written in the first language.

FIG. 7 shows an exemplary method 700 for compiling, in accordance with an embodiment of the present principles. In the embodiment of FIG. 7, method 700 involves transforming a program written in a domain-specific language (DSL) to a program written in a target programming language. Thus, in an embodiment, method 700 can involve cross-compiling, from the DSL to the target programming language. Moreover, in an embodiment, method 700 can be considered to show further steps applicable to method 600, in accordance with an embodiment of the present principles.

At step 705, receive input code (e.g., written in the DSL) for compiling.

At step 710, perform a lexical analysis of the input code.

At step 715, perform a syntactical analysis of the input code.

At step 720, perform a semantic analysis of the input code.

At step 725, perform a data representation type check between the source compiler and the existing compiler. While shown as a separate step, it is to be appreciated that step 725 can be performed as part of, e.g., step 715 or step 720.

At step 730, store any errors identified during the data representation type check performed at step 725 in a special AST node.

At step 735, generate an intermediate representation (IR) of the input code (for the middle-end). In an embodiment, the IR is generated based on a result(s) of one or more of the analysis performed in steps 710, 715, and 720 and the check performed in step 725. In an embodiment, step 735 involves converting an abstract syntax tree (AST) created by the DSL compiler into an AST supported by the existing compiler.

At step 740, perform optimizations on the intermediate representation.

At step 745, generate another intermediate representation (for the back-end).

At step 750, generate a target code corresponding to the input code. The target code is generated from the other intermediate represented (generated at step 745). The target code is generated to include the stored information from the special AST node as-is.

Thus, by referring to table of type conversions (hereinafter type conversions table) between a DSL and ROSE compiler, when an AST created by the DSL compiler is converted into a ROSE AST, if a corresponding type that is listed in the type conversions table is found, the corresponding type is converted according to the conversion rule in the type conversions table, and if a compilation error occurs during the semantic analysis at the time of conversion into a ROSE AST, a special AST node is created to store the information of an error token, when unparser outputs the source code, the stored information in the special AST node is extracted as-is into the output source code.

FIG. 8 shows an exemplary table 800 of type conversion between DSL and ROSE, in accordance with an embodiment of the present principles.

In the table 800, correlations 810 are made between data type representations between DSL and ROSE as follows. The correlations 810 are used to substitute code on one side (left) with code on the other side (right).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of" for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   implementing a function not present in a compiler for a first language-using a compiler for a second language, the implementing further comprising:
   generating, by the compiler for the first language, a first abstract syntax tree;
   converting the first abstract syntax tree to a second abstract syntax tree of the compiler for the second language using a conversion table;
   when a compilation error occurs in the compiler for the second language, generating therein a special node for error processing in the second abstract syntax tree and storing an error token indicating information of the compilation error in the special node; and
   when unparsing by the compiler for the second language, outputting the error token stored in the special node.

2. The method of claim 1, further comprising generating optimized code for the function in the second language.

3. The method of claim 1, wherein said converting step converts the first abstract syntax tree to the second abstract syntax tree while disregarding helper classes for assisting in the conversion.

4. The method of claim 1, further comprising performing a data representation type check between data representation types of the first compiler and the second compiler to detect the compilation error.

5. The method of claim 4, further comprising attributing the compilation error to a data type representation mismatch between the first compiler and the second compiler.

6. The method of claim 5, further comprising attributing other errors occurring during a semantic analysis to the data type representation mismatch.

7. A non-transitory article of manufacture tangibly embodying a computer readable program which when executed causes a computer to perform the steps of claim 1.

8. A method, comprising:
   transforming a program from a first language to a second language using a compiler for a third language and data type representation conversion without helper classes, wherein said transforming step includes:
   generating, by a compiler for the first language, an abstract syntax tree;
   converting, by the compiler for the third language, the first abstract syntax tree to a given abstract syntax tree of the compiler for the third language using a conversion table;
   when a compilation error occurs in the compiler for the third language, generating therein a special node for error processing in a second abstract syntax tree of the compiler of the second language and storing an error token indicating information of the compilation error in the special node; and
   when unparsing by the compiler for the second language, outputting the error token stored in the special node.

9. The method of claim 8, further comprising generating optimized code by the compiler for the second language.

10. The method of claim 8, wherein said converting step converts the first abstract syntax tree to the given abstract syntax tree while disregarding helper classes for assisting in the conversion.

11. The method of claim 8, further comprising performing a data representation type check between data representation types of the first compiler and the third compiler to detect the compilation error.

12. The method of claim 11, further comprising attributing the compilation error to data type representation mismatch between the first compiler and the second compiler.

13. The method of claim 12, further comprising attributing other errors occurring during a semantic analysis to the data type representation mismatch.

14. The method of claim 8, further comprising using optimization support provided by the compiler for the third language to provide optimized code from the compiler for the second language.

15. A non-transitory article of manufacture tangibly embodying a computer readable program which when executed causes a computer to perform the steps of claim 8.

16. A system, comprising:
 a memory coupled to a hardware processor;
 a compiler for a first language, a first abstract syntax tree;
 a compiler for a second language,
 a data representation type converter for converting the first abstract syntax tree to a second abstract syntax tree of the compiler for the second language using a conversion table,
 wherein the compiler for the second language, when a compilation error occurs, generates a special node for error processing, using the hardware processor, in the second abstract syntax tree and stores in the special node an error token indicating information of the compilation error; and
 wherein said compiler for the second language, when unparsing, outputs the error token stored in the special node is output.

17. The system of claim 16, wherein the compiler for the second language generates optimized code.

18. The system of claim 16, wherein said data representation type converter converts the first abstract syntax tree to the second abstract syntax tree while disregarding helper classes for assisting in the conversion.

19. The system of claim 16, wherein said compiler for the second language performs a data representation type check to detect the compilation error based on a data type representation mismatch between the first compiler and the second compiler.

20. The system of claim 19, wherein said compiler for the second language attributes other errors occurring during a semantic analysis to the data type representation mismatch.

\* \* \* \* \*